(12) United States Patent
Takada et al.

(10) Patent No.: US 6,850,520 B1
(45) Date of Patent: *Feb. 1, 2005

(54) ATM LAYER CELL PROCESSING APPARATUS

(75) Inventors: Shuji Takada, Kawasaki (JP); Yasuhiro Ooba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/409,145

(22) Filed: Sep. 30, 1999

(30) Foreign Application Priority Data

Nov. 4, 1998 (JP) .......................................... 10-312787

(51) Int. Cl.[7] .............................................. H04L 12/28
(52) U.S. Cl. .................................... 370/389; 370/395.1
(58) Field of Search .......................... 370/241.1, 236.1, 370/236.2, 395, 395.1, 395.6, 389

(56) References Cited

U.S. PATENT DOCUMENTS 5,659,540 A * 8/1997 Chen et al. ................. 370/249
5,864,555 A * 1/1999 Mathur et al. .............. 370/395
5,948,067 A * 9/1999 Caldara et al. ............. 709/236
6,373,844 B1 * 4/2002 Saito ........................ 370/395.1

* cited by examiner

*Primary Examiner*—Wellington Chin
*Assistant Examiner*—Brenda Pham
(74) *Attorney, Agent, or Firm*—Katten Muchin Zavis Rosenman

(57) ABSTRACT

An ATM layer cell processing apparatus is provided with a plurality of cell processing sections, including a plurality of OAM cell processors provided with respect to each of OAM cell types, a cell identifying section outputting cell type information by decoding header information of an arrived cell, an OAM identifying section outputting OAM identification information including OAM type information identified based on OAM cell information of a payload and the cell type information, where the cell identifying section and the OAM identifying section are provided in common with respect to the plurality of cell processing sections including the plurality of OAM cell processors, and a mechanism sending the OAM ell type information and cell data of the arrived cell to a cell processing section which is to process the arrived cell at a subsequent stage, based on the OAM identification information output from the OAM identification section.

18 Claims, 15 Drawing Sheets

FIG. 1

CELL IDENTIFICATION TABLE

| VPI (8or12bits) | VCI (12bits) | | PTI (3bits) | CELL TYPE |
|---|---|---|---|---|
| ARBITRARY VALUE | 0000 0000 0000 0011 | | 000 or 010 | VP OAM CELL (SEGMENT) |
| | 0000 0000 0000 0100 | | | VP OAM CELL (END-END) |
| | ARBITRARY VALUE OTHER THAN ALL "0" | | 100 | VC OAM CELL (SEGMENT) |
| | | | 101 | VC OAM CELL (END-END) |
| | | | 110 | RM (RESOURCE MANAGEMENT) CELL |
| | | | OTHER THAN ABOVE | USER CELL |

FIG. 2

OAM CELL IDENTIFICATION TABLE

| OAM TYPE (4bits) | FUNCTION TYPE (4bits) | OAM CELL TYPE |
|---|---|---|
| 0001 | 0000 | AIS CELL |
|  | 0001 | RDI CELL |
|  | 0100 | CC CELL |
|  | 1000 | LB CELL |
| 0010 | 0000 | FORWARD PM CELL |
|  | 0001 | BACKWARD PM CELL |
| 1000 | 0000 | PERFORMANCE MONITORING START/STOP CELL |
|  | 0001 | CONNECTION CONFIRMATION START/STOP CELL |

ATM LAYER CELL PROCESSING APPARATUS

BACKGROUND OF THE INVENTION

1. Field of the Invention

The present invention generally relates to Asynchronous Transfer Mode (ATM) layer cell processing apparatuses, and more particularly to an ATM layer cell processing apparatus which processes cells such as Operation Administration and Maintenance (OAM) cells in an ATM layer of an ATM which is used in a broadband Integrated Services Digital Network (ISDN).

2. Description of the Related Art

Processing of cells in the ATM layer primarily includes functions such as a Usage Parameter Control (UPC) function which monitors a quality of a network, and an OAM function which monitors, detects and notifies failures and also monitors a communication quality.

The UPC function monitors a flow of cells flowing into the network, and monitors whether or not a communication is being made by following a usage band declared by a user. A process such as adding a tag to the cell or discarding the cell is carried out with respect to the cell which flows into the network by exceeding the usage band.

On the other hand, the OAM function transfers special cells called the OAM cells, and monitors the failures, the communication quality or the like. The OAM cells include various types, such as a Loop Back (LB) cell which is used to monitor whether or not a connection is actually set, an Alarm Indication Signal (AIS) cell which is used to notify a transmission path or a failure of an equipment, a Remote Defect Indicator (RDI) cell which is used to notify a failure detection to a remote equipment, and a Performance Monitoring (PM) cell which is used to monitor a transfer delay time, the communication quality and the like of the network.

The ATM layer terminates these OAM cells, and an OAM cell processing block carries out processes for various kinds of failure notifications and monitorings depending on the types of OAM cells. In addition, the OAM cell processing block also carries out an ATM layer process to assemble and insert the OAM cells.

In a case where the OAM cell processing block is divided into a LB cell processing section, a PM cell processing section and the like for each of the types of OAM cells, the cell processing section for each type of OAM cell must make a reference to a cell type, an OAM type and a function type of the input cell, and judge whether the input cell is to be processed in the cell processing section or the cell is to be processed by another cell processing section.

The cell type, the OAM type and the function type of the input cell are identified by making a reference to a cell identification table and an OAM identification table, based on contents of header information and OAM cell information field (payload) of the input cell. FIG. 1 shows the contents of the cell identification table, and FIG. 2 shows the contents of the OAM identification table.

From the cell identification table shown in FIG. 1, the cell types including a Virtual Path (VP) OAM cell (for segment), a VP OAM cell (for end-end), a VC OAM cell (for segment), and a VC OAM cell (for end-end) are discriminated based on a Virtual Path Identifier (VPI), Virtual Path Identifier (VCI) and Payload Type Indication (PTI) in the header information of the input cell.

A "segment" refers to a passing point of the cell, which is included in connecting points in the network. On the other hand, an "end-end" refers to an equipment forming an end point which terminates the cell.

The VP OAM cell (for segment) is an OAM cell for use between VP switches. The VP OAM cell (for end-end) and the VC OAM cell (for segment) are OAM cells for use between switching systems. In addition, the VC OAM cell (for end-end) is an OAM cell for use between user equipments.

With respect to the cells which are discriminated as being the OAM cells based on the cell identification table shown in FIG. 1, a reference is made to the OAM identification table shown in FIG. 2. From this OAM identification table, the OAM cell types including the AIS cell, the RDI cell, a Continuity Check (CC) cell, the LB cell, a Forward PM cell, a Backward PM cell, a performance monitoring start/stop cell, and a connection confirmation start/stop cell are discriminated based on data contents of the OAM type and the function type in the OAM cell information field.

FIG. 3 is a functional block diagram showing a conventional ATM layer cell processing apparatus in which a plurality of OAM cell processors are provided series. In addition, FIG. 4 is a functional block diagram showing a conventional ATM layer cell processing apparatus in which a plurality of OAM cell processors are provide in parallel. In FIG. 4, those parts which are the same as those corresponding parts in FIG. 3 are designated by the same reference numerals.

In FIGS. 3 and 4, a UPC processor 31 includes a cell identifying section, and decodes the header information of the input cell. This UPC processor 31 has a function of carrying out the UPC with respect to the arriving cell for each VPI or VCI.

A plurality of OAM cell processors 32 are provided, and one OAM cell processor 32 is provided with respect to each OAM cell type. Each OAM cell processor 32 is provided with a cell identifying section and a processing subject judging section, and discriminates the cell types shown in FIG. 1 by decoding the header information of the input cell. If the input cell is an OAM cell, the OAM cell information field is decoded, so as to discriminate the OAM cell types shown in FIG. 2. In other words, the OAM cell types are discriminated to determine whether or not the input cell is the subject of the processing in the OAM cell processor 32, and a corresponding OAM processing is carried out if the input cell is the subject of the processing in this OAM cell processor 32.

A cell processing judging section 33 judges whether or not the OAM cell output from each OAM cell processor 32 is to be discarded or inserted into a cell highway. A judgement result of the cell processing judging section 33 is output to a discard and insert processor 34 together with each OAM cell. The discard and insert processor 34 discards the OAM cell or inserts the OAM cell in the cell highway, depending on the judgement result from the cell processing judging section 33.

But according to the conventional ATM layer cell processing apparatuses shown in FIGS. 3 and 4, the following problems occur.

First, in each OAM cell processor 32 which is provided with respect to a corresponding OAM cell type, it is necessary to provide the cell identifying section and the processing subject judging section which respectively carry out cell identification and OAM identification which are similar and overlap, with respect to one input cell. As a result, the construction and the processing within the OAM cell processor 32 are complex, thereby increasing both the scale and the processing delay of the ATM layer cell processing apparatus.

Second, it is essential to provide the cell processing judging section 33 which collects the processed results of the OAM cell processors 32 which are provided with respect to each of the OAM cell types, and finally determines the discard or insert process with respect to the OAM cells.

Third, when the OAM cell processors 32 are to be operated in parallel, the cell identifying sections and the processing subject judging sections within the plurality of OAM cell processor 32 are operated simultaneously when the cell arrives, thereby increasing the power consumption of the ATM layer cell processing apparatus.

SUMMARY OF THE INVENTION

Accordingly, it is a general object of the present invention to provide a novel and useful ATM layer cell processing apparatus in which the problems described above are eliminated.

Another and more specific object of the present invention is to provide an ATM layer cell processing apparatus which can reduce the scale of OAM cell processors by using a common section to carry out overlapping functions of each of the OAM cell processors, and improve the processing efficiency by carrying out a schedule management of cell processings subsequent to OAM identification.

Still another object of the present invention is to provide an ATM layer cell processing apparatus comprising a plurality of cell processing sections, including a plurality of OAM cell processors provided with respect to each of OAM cell types, a cell identifying section outputting cell type information by decoding header information of an arrived cell, an OAM identifying section outputting OAM identification information including OAM type information identified based on OAM cell information of a payload and the cell type information, where the cell identifying section and the OAM identifying section are provided in common with respect to the plurality of cell processing sections including the plurality of OAM cell processors, and a mechanism sending the OAM ell type information and cell data of the arrived cell to a cell processing section which is to process the arrived cell at a subsequent stage, based on the OAM identification information output from the OAM identification section. According to the ATM layer cell processing apparatus of the present invention, the cell identifying section and the OAM identifying section are constructed as a single and a common functional block with respect to each of the OAM cell processing sections or OAM cell processors. For this reason, it is possible to reduce the scale of the ATM layer cell processing apparatus, particularly the part associated with the OAM cell processing section or OAM cell processors. In addition, by adding a schedule management function of the cell process subsequent to the OAM identifying section, it becomes possible to carry out a parallel processing with respect to the cell processing, and to improve the cell processing efficiency. Moreover, by arranging the OAM identifying section and the UPC processor at a stage subsequent to the cell identifying section, it becomes possible to further improve the cell processing efficiency.

Other objects and further features of the present invention will be apparent from the following detailed description when read in conjunction with the accompanying drawings.

BRIEF DESCRIPTION OF THE DRAWINGS

FIG. 1 is a diagram showing contents of a cell identification table;

FIG. 2 is a diagram showing contents of an OAM identification table;

DESCRIPTION OF THE PREFERRED EMBODIMENTS

Figure 3:
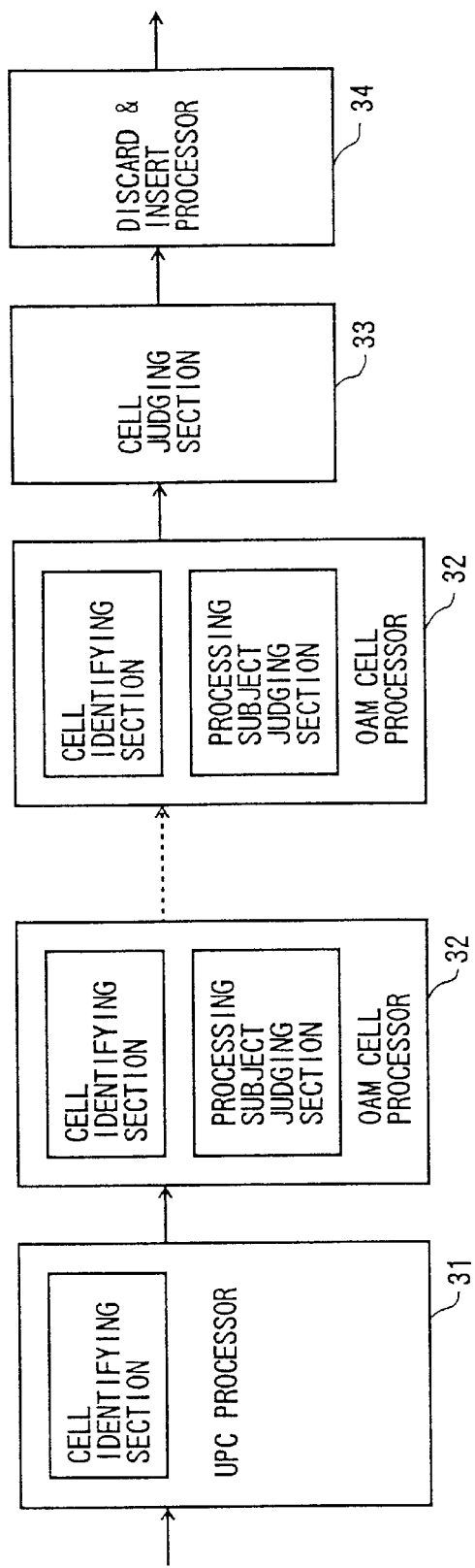
FIG. 3 is a functional block diagram showing a conventional ATM layer cell processing apparatus in which a plurality of OAM cell processors are provided series.
Figure 4:
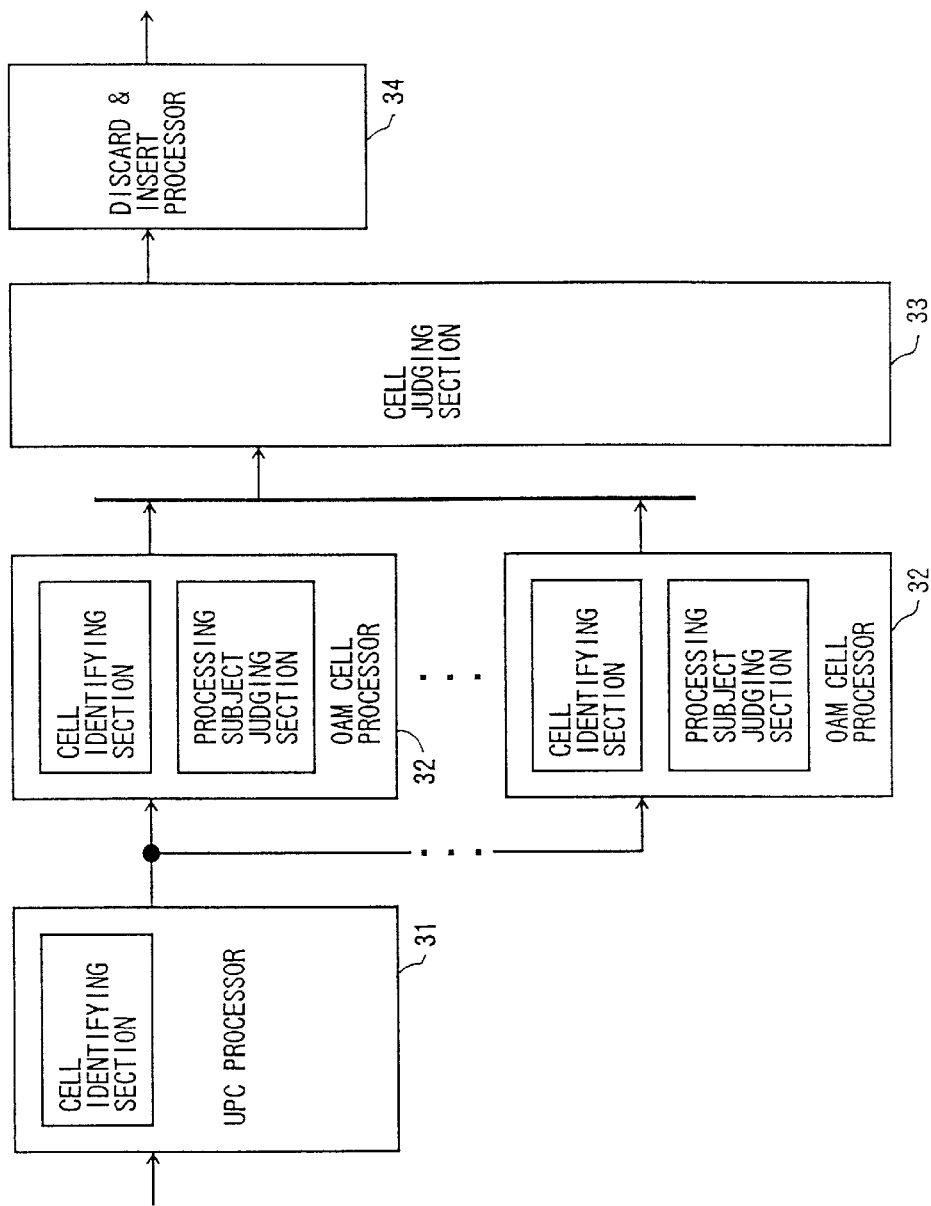
FIG. 4 is a functional block diagram showing a conventional ATM layer cell processing apparatus in which a plurality of OAM cell processors are provide in parallel.
Figure 5:
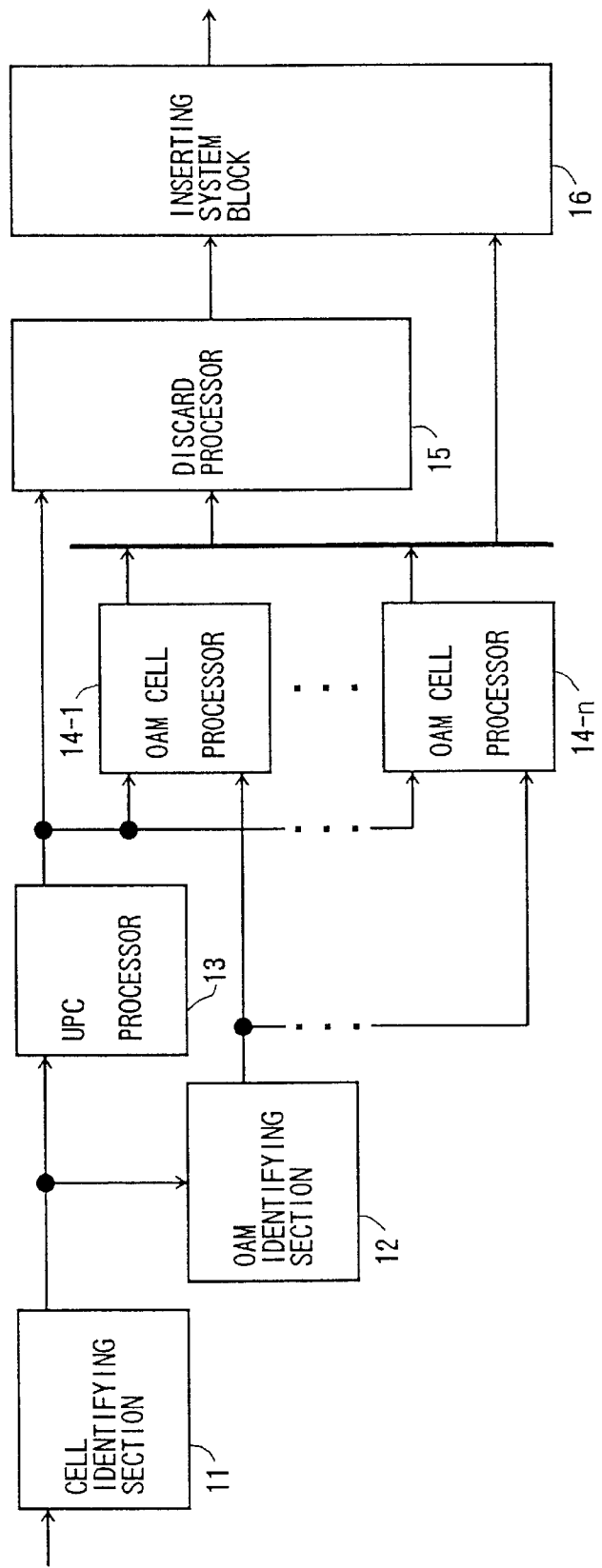
FIG. 5 is a functional block diagram showing a first embodiment of an ATM layer cell processing apparatus according to the present invention.

FIG. 5 is a functional block diagram showing a first embodiment of an ATM layer cell processing apparatus according to the present invention. In addition to the functional blocks of the conventional ATM layer cell processing apparatuses described above in conjunction with FIGS. 3 and 4, this embodiment includes a cell identifying section 11 and an OAM identifying section 12 which are provided in common with respect to each of OAM cell processors 14-1 through 14-n. The cell identifying section 11 decodes header information of an input cell and outputs cell type information. The OAM identifying section 12 outputs OAM identification information based on cell type information and contents of an OAM cell information field.

The input cell which is transferred and arrives to the ATM layer cell processing apparatus is input to the cell identifying section 11. The cell identifying section 11 extracts from the header information of the input cell the cell type (that is, a user cell or an OAM cell, for example), and information indicating whether the cell is a cell between end-end or a cell between segments.

In addition, the cell identifying section 11 also extracts from the header information of the input cell information (NVP, UVP, VC and the like) related to the connection type. The extracted cell identification information is output from the cell identifying section 11 to the OAM identifying section and a UPC processor 13 together with the input cell.

The OAM identifying section 12 decodes the OAM type and the function type stored in the OAM cell information field of the cell in addition to the cell identification information received from the cell identifying section 11. Based on this decoding, the OAM identifying section 12 judges the OAM cell type of the input cell, and outputs OAM identification information which includes an OAM cell type code to each of the OAM cell processors 14-1 through 14-n.

Each of the OAM cell processors 14-1 through 14-n receives the OAM identification information from the OAM identifying section 12, and the OAM cell processor which is specified by the OAM identification information reads the input cell and carries out an OAM cell processing.

Further, the OAM identifying section 12 makes a reference to an end point setting which is set for each VP connection or VC connection, and judges whether the input OAM cell is to be terminated at its own connecting point or is to be passed through. This judgment result of the OAM judging section 12 is output to each of the OAM cell processors 14-1 through 14-n.

Accordingly, the OAM identifying section 12 centrally manages the end point setting, and each of the OAM cell processors 14-1 through 14-n makes a reference to the judgement result of the OAM identifying section 12 indicating termination or passing through of the input OAM cell, without having to make a reference to the end point setting, and the cell is processed by only the OAM cell processor which is to process the cell.

Each of the OAM cell processors 14-1 through 14-n is terminated at its own connecting point, and outputs to a discard processor 15 a discard instruction for a cell which is to be discarded. The discard processor 15 discards the cell depending on the discard instruction received from the UPC processor 13 or any of the OAM cell processors 14-1 through 14-n.

Moreover, in a case where a cell to be inserted exists, each of the OAM cell processors 14-1 through 14-n outputs an insert instruction to an inserting system block 16. The inserting system block 16 hunts for an idle cell depending on the insert instruction, and inserts the cell in place of the idle cell.

Therefore, although one cell identifying section and one processing subject judging section must conventionally be provided with respect to each OAM cell processor, this embodiment uses one cell identifying section 11 and one OAM identifying section 12 in common with respect to each of the OAM cell processors 14-1 through 14-n. For this reason, this embodiment can reduce the scale of the ATM layer cell processing apparatus, particularly the scale of the OAM cell processors 14-1 through 14-n. In addition, since it is unnecessary for a plurality of OAM cell processors to simultaneously carry out the cell identifying and OAM cell type identifying processes with respect to the input cell, this embodiment can easily realize the parallel processing of the OAM cell processings for each OAM cell type.

Furthermore, the UPC processor 13 carries out the UPC based on the connection type information which is extracted by the cell identifying section 11. Consequently, the UPC processor 13 does not require the function of decoding the header information of the input cell, and the scale of the UPC processor 13 can be reduced.

Figure 6:
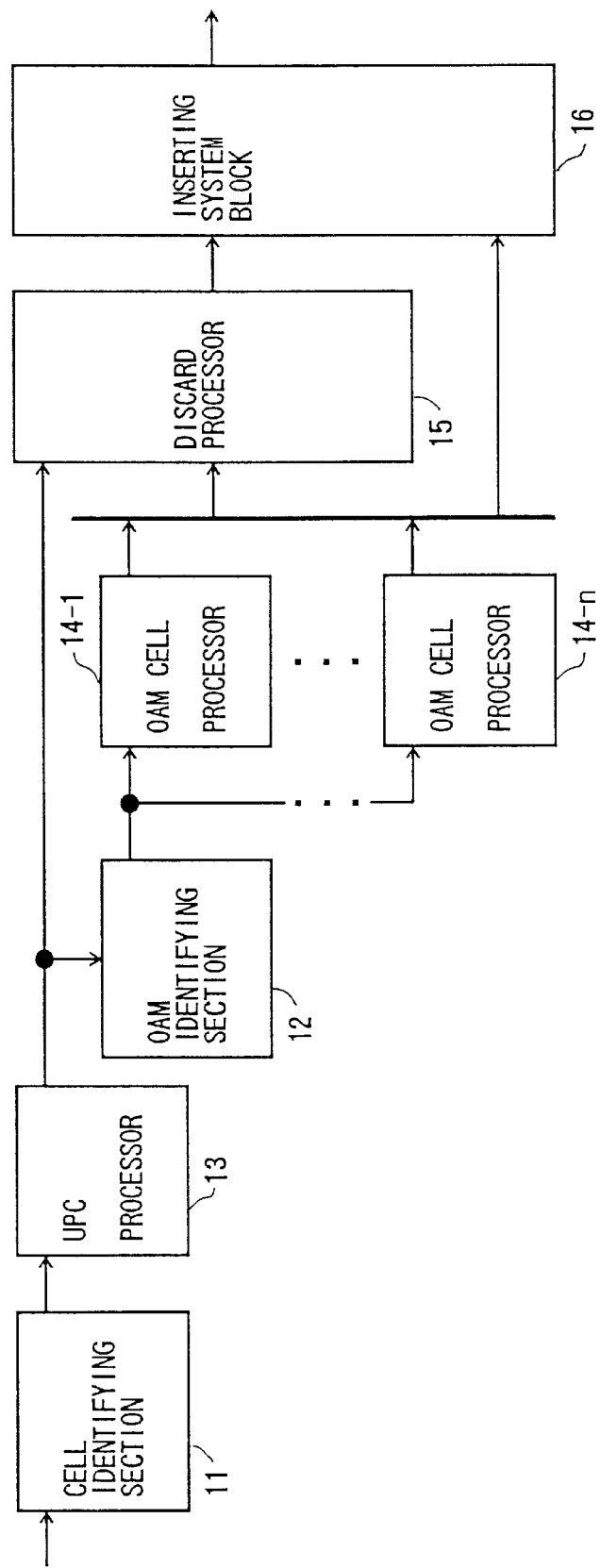
FIG. 6 is a functional block diagram showing a second embodiment of the ATM layer cell processing apparatus according to the present invention.

FIG. 6 is a functional block diagram showing a second embodiment of the ATM layer cell processing apparatus according to the present invention. In FIG. 6, those parts which are the same as those corresponding parts in FIG. 5 are designated by the same reference numerals, and a description thereof will be omitted.

In this embodiment, the OAM identifying section 12 of the first embodiment is arranged at a stage subsequent to the UPC processor 13. The OAM identifying section 12 makes a reference to a judgement result indicating a conformity or non-conformity of the UPC carried out by the UPC processor 13. Based on this judgement result of the UPC processor 13, the OAM identifying section 12 outputs the OAM identification information to each of the OAM cell processors 14-1 through 14-n.

In other words, if the judgement result of the UPC is non-conformity, the OAM cell processors 14-1 through 14-n do not need to process the OAM cell. Hence, the OAM identifying section 12 outputs an OAM identification code which indicates "no process", and each of the OAM cell processors 14-1 through 14-n processes the OAM cell depending on the OAM identification code.

In this embodiment, the OAM identifying section 12 integrally processes the common processes which are carried out in the first embodiment by the OAM cell processors 14-1 through 14-n depending on the judgement result of the UPC of the UPC processor 13.

Accordingly, in this embodiment, the processes carried out by each of the OAM cell processors 14-1 through 14-n depending on the judgement result of the UPC are absorbed by the OAM identifying section 12, so that the scale of the OAM cell processors 14-1 through 14-n can further be reduced compared to the first embodiment.

In each of the first and second embodiments described above, it is possible to provide in the OAM identifying section 12 a function of inputting information which indicates a monitoring point of the UPC. In this case, it is possible to change the monitoring point of the UPC by simply changing the monitoring point information of the UPC when inputting the monitoring point information to the OAM identifying section 12.

Figure 7:
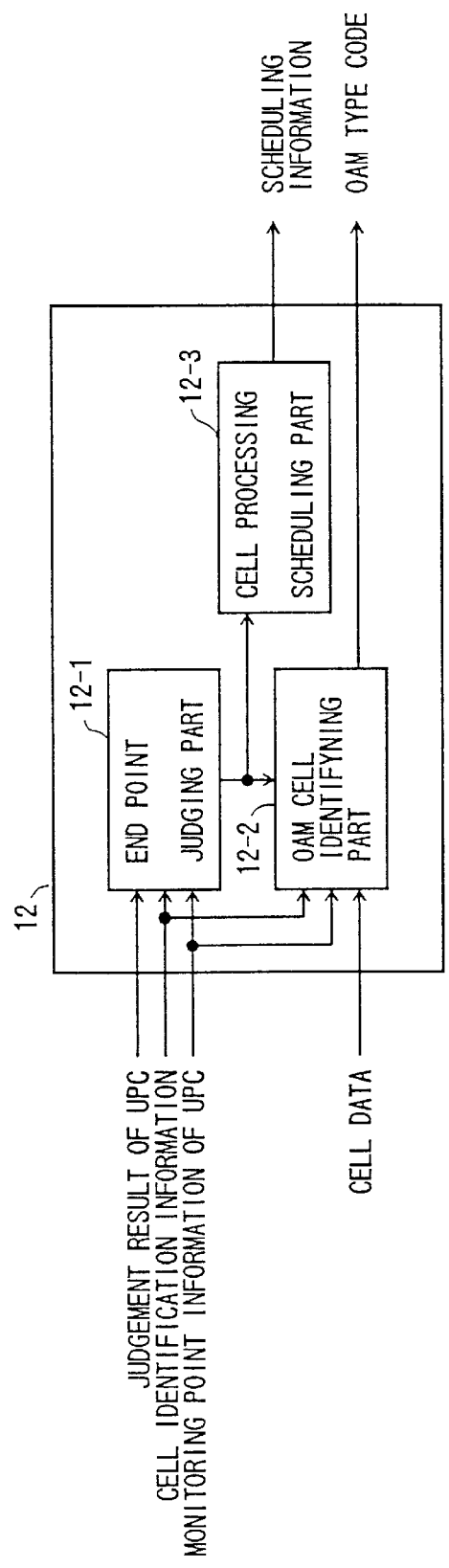
FIG. 7 is a functional block diagram showing an OAM identifying section.

FIG. 7 is a functional block diagram showing the OAM identifying section 12. The OAM identifying section 12 includes an end point judging part 12-1, an OAM cell identifying part 12-2, and a cell processing scheduling part 12-3 which are connected as shown in FIG. 7.

The end point judging part 12-1 receives the judgement result of the UPC from the UPC processor 13, the cell identification information form the cell identifying section 11, and the monitoring point information of the UPC. The end point judging part 12-1 judges whether or not its own connecting point becomes an end point with respect to the arriving OAM cell, and outputs a judgement result to the OAM cell identifying part 12-2 and the cell processing scheduling part 12-3.

The OAM cell identifying part 12-2 receives the cell identification information from the cell identifying section 11, the monitoring point information of the UPC, and the cell data. The OAM cell identifying part 12-2 identifies the OAM cell type of the arriving cell, and outputs an OAM type code to the cell processing scheduling part 12-3 and each of the OAM cell processors 14-1 through 14-n.

The cell processing scheduling part 12-3 determines an OAM cell processor which is to process the arriving cell and a cell processing schedule of this OAM cell processor, based on the judgement result from the end point judging part 12-1 and the OAM type code from the OAM cell identifying part 12-2. In addition, the cell processing scheduling part 12-3 outputs scheduling information including information which specifies the OAM cell processor which is to process the arriving cell.

The cell processing scheduling part 12-3 of the OAM identifying section 12 can uniquely determine a target cell processing section which is to process the cell subsequent to the identification of the OAM cell type, based on the OAM type code. Hence, by operating only the target cell processing section which is to process the arriving cell, the cell processing scheduling part 12-3 can manage the cell processing schedule subsequent to the identification of the OAM cell type with respect to each input cell, such as stopping the cell processing section other than the target cell processing section so as to reduce the power consumption.

The cell processing section may be any one of the OAM cell processors 14-1 through 14-n, the discard processor 15 and the inserting system block 16.

Figure 8:
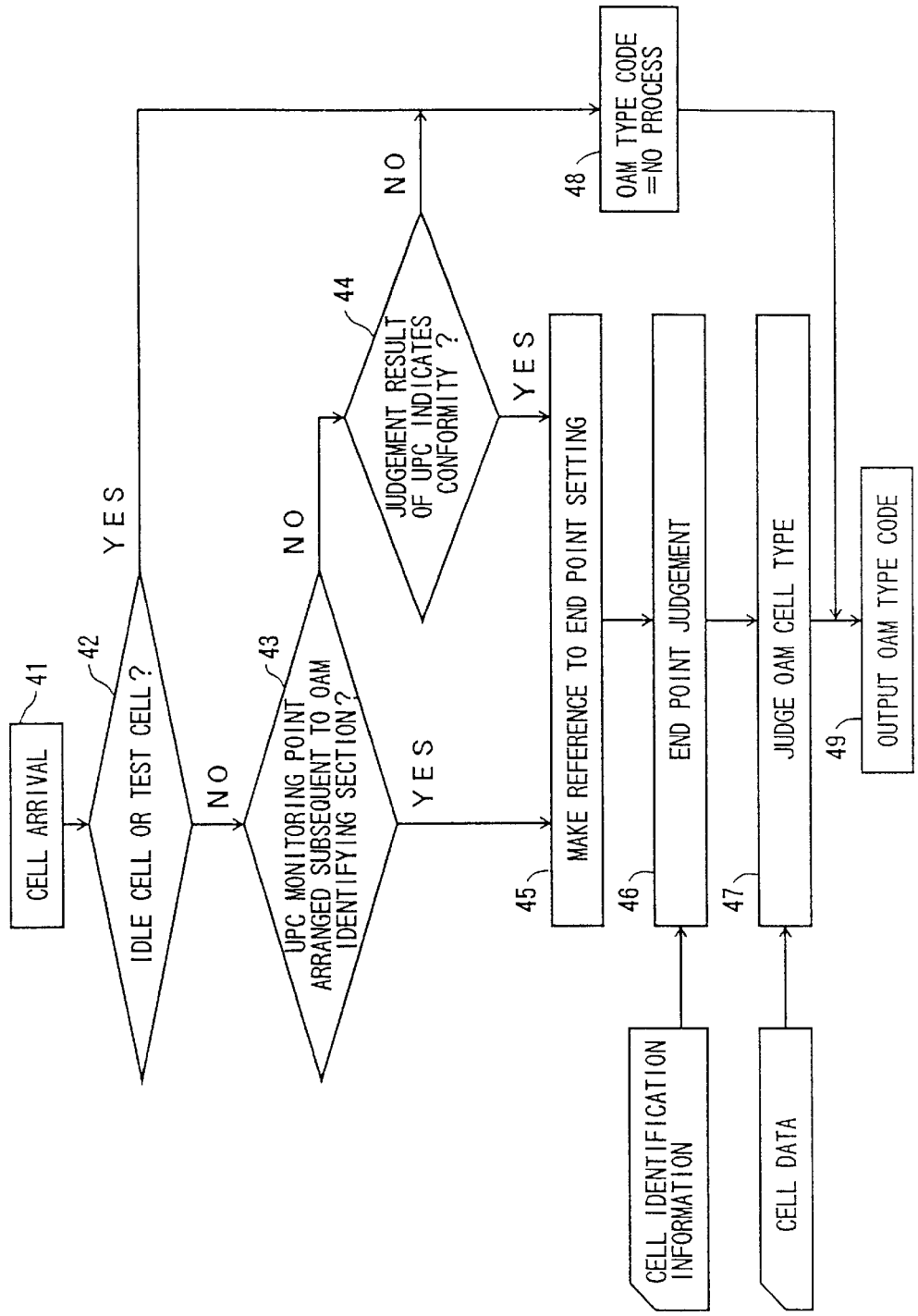
FIG. 8 is a flow chart for explaining an OAM type code determination process of the OAM identifying section.

FIG. 8 is a flow chart for explaining an OAM type code determination process of the OAM identifying section 12. In FIG. 8, when a cell arrives at the OAM identifying section 12 in a step 41, a step 42 decides whether or not the arrived cell is an idle cell or a test cell. If the arrived cell is an idle cell or a test cell and the decision result in the step 42 is YES, a step 48 sets the OAM type code to the code which indicates "no process", and a step 49 outputs this OAM type code.

On the other hand, if the arrived cell is not an idle cell or a test cell and the decision result in the step 42 is NO, a step 43 decides whether or not the UPC monitoring point is arranged at a stage subsequent to the OAM identifying section 12. If the UPC monitoring point is arranged at the stage subsequent to the OAM identifying section 12 and the decision result in the step 43 is YES, a step 45 makes a reference to the end point setting regardless of the judgement result of the UPC.

On the other hand, if the UPC monitoring point is arranged at a stage preceding the OAM identifying section 12 and the decision result in the step 43 is NO, a step 44 decides whether or not the judgement result of the UPC indicates conformity. If the judgement result of the UPC indicates non-conformity and the decision result in the step 44 is NO, the step 48 sets the OAM type code to the code which indicates "no process", and the step 49 outputs this OAM type code.

If the judgement result of the UPC indicates conformity and the decision result in the step 44 is YES, the step 45 makes a reference to the end point setting. Then, a step 46 carries out an end point judgement based on the referred information on the end point setting and the cell identification information. The end point judgement includes judging whether or not the cell is to be terminated as an OAM cell for end-end, judging whether or not the cell is to be terminated as an OAM cell for segment, judging whether or not the cell is to be passed through as an OAM cell for segment, and the like.

Next, with respect to the OAM cell which is terminated, a step 47 judges the OAM cell type based on information related to the OAM type and the function type in the OAM cell information field of the cell data. In addition, the step 49 outputs the OAM type code of the OAM cell type judged in the step 47.

Figure 9:
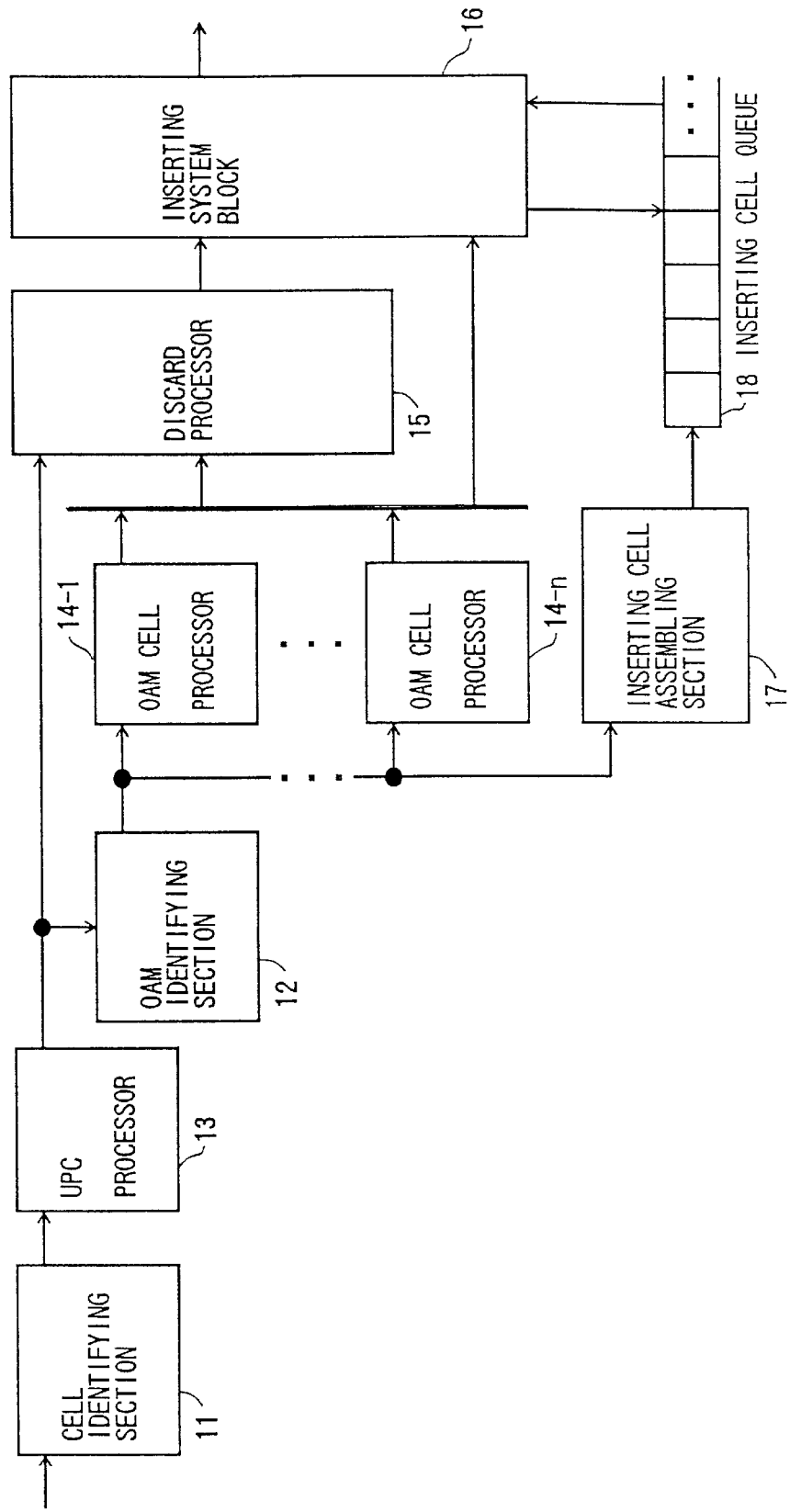
FIG. 9 is a functional block diagram showing a third embodiment of the ATM layer cell processing apparatus according to the present invention.

FIG. 9 is a functional block diagram showing a third embodiment of the ATM layer cell processing apparatus according to the present invention. In FIG. 9, those parts which are the same as those corresponding parts in FIGS. 5 and 6 are designated by the same reference numerals, and a description thereof will be omitted.

In this embodiment, an inserting cell assembling section 17 and an inserting cell queue 18 are added to the second embodiment described above in conjunction with FIG. 6.

The OAM identifying section 12 can make a reference to the cell identification information, the judgement result of the UPC, and the OAM cell type identification result (or OAM type code), and specify the OAM cell which is output from each of the OAM cell processors 14-1 through 14-n. The OAM identifying section 12 outputs to the inserting cell assembling section 17 information which is required to assemble the OAM cells from each of the OAM cell processors 14-1 through 14-n.

The inserting cell assembling section 17 assembles the inserting OAM cells based on the cell identification information, the judgement result of the UPC, and the OAM cell type identification result which are output from the OAM identifying section 12, and successively stores the assembled inserting OAM cell in the inserting cell queue 18. The inserting cell queue 18 links to the inserting system block 16, and successively sends to the idle cell hunted by the inserting system block 16 the cell starting from the start of the inserting cell queue 18.

Accordingly, the OAM cell assembling process conventionally carried out in each OAM cell processor or OAM cell inserting section is carried out in the inserting cell assembling section 17 in this embodiment. In other words, this embodiment can carry out the cell processings of the OAM cell processors 14-1 through 14-n in parallel with the cell assembling process of the inserting cell assembling section 17, thereby improving the cell processing speed in the ATM layer.

Figure 10:
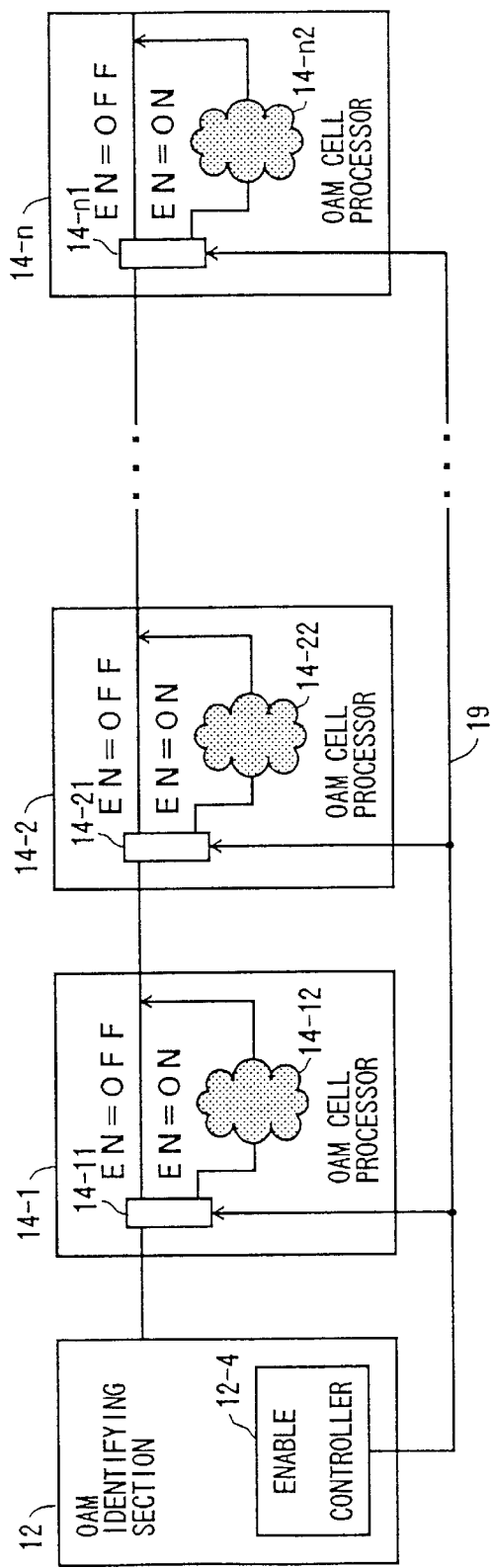
FIG. 10 is a diagram for explaining a cell processing schedule of OAM cell processors.
Figure 11:
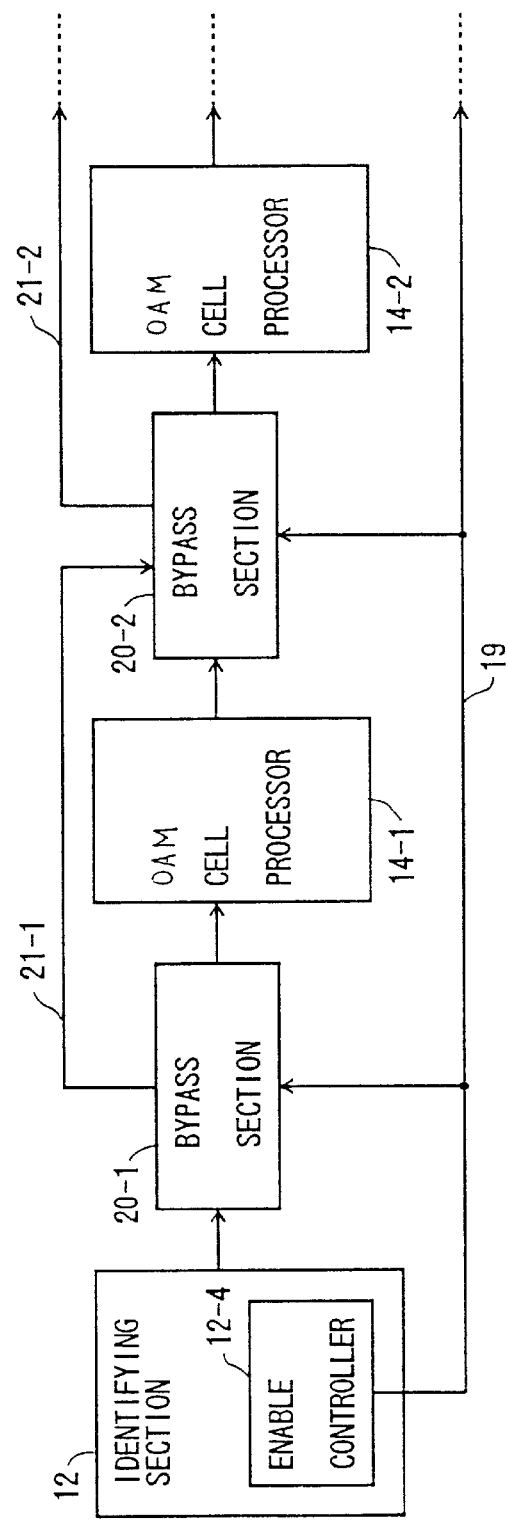
FIG. 11 is a diagram for explaining a cell processing schedule of OAM cell processors.

FIGS. 10 through 13 are diagrams for explaining a cell processing schedule in the ATM layer cell processing apparatus of the present invention. More particularly, FIGS. 10 and 11 are diagrams sequentially showing the construction of the cell processing sections subsequent to the OAM identifying section 12. In FIGS. 10 through 13, those parts which are the same as those corresponding parts in FIGS. 5, 6 and 9 are designated by the same reference numerals, and a description thereof will be omitted.

In FIG. 10, the OAM identifying section 12 includes an enable controller 12-4 which controls the operation enable of each of the OAM cell processors 14-1 through 14-n which are provided sequentially. An operation enable signal 19 turns the operation enable ON with respect to a target OAM cell processor which is to process the input cell, and turns the operation enable OFF with respect to the OAM cell processors other than the target OAM cell processor.

Each of the OAM cell processors 14-1 through 14-n includes an operation enable (EN) setting parts 14-11 through 14-nn which are set by the enable controller 12-4 of the OAM identifying section 12. For example, the OAM cell processor 14-2 includes the operation enable (EN) setting parts 14-21 through 14-2n.

Each of the OAM cell processors other than the target OAM cell processor, with respect to which the operation enable (EN) is turned OFF, carries out no process on the input cell and sends the input cell as it is to the OAM cell processor provided in the next stage. On the other hand, each target OAM cell processor, with respect to which the operation enable (EN) is turned ON, carries out an OAM processing on the input cell, and sends the OAM cell to the OAM cell processor provided in the next stage.

On the other hand, bypass sections 20-1 through 2-n may be provided to bypass the corresponding OAM cell processors 14-1 through 14-n as shown in FIG. 11. For the sake of convenience, only the OAM cell processors 14-1 and 14-2 and the bypass sections 20-1 and 20-2 are shown in FIG. 11. In FIG. 11, the bypass sections 20-1 through 20-n are controlled depending on the ON/OFF state of the operation enable signal 19, so as to bypass the OAM cell processors other than the target OAM cell processor with respect to which the operation enable (EN) is turned ON, via bypass routes 21-1 through 21-n. For the sake of convenience, only the bypass routes 21-1 and 21-2 are shown in FIG. 11. Hence, the cell bypasses each OAM cell processor other than the target OAM cell processor with respect to which the operation enable (EN) is turned ON, and is input to the OAM cell processor provided in the next stage via the respective bypass route.

Each of the bypass sections 20-1 through 20-n with respect to which the operation enable (EN) is turned OFF blocks the supply of a clock signal to the corresponding one of the OAM cell processors 14-1 through 14-n, so as to stop the operation of the OAM cell processors other than the target OAM processor with respect to which the operation enable (EN) is turned ON.

By stopping the operation of the OAM cell processors other than the target OAM cell processor which is to process the input cell as in the structures shown in FIGS. 10 and 11, it becomes possible to reduce the power consumption of the OAM cell processors 14-1 through 14-n as a whole. In addition, in the case of the structure shown in FIG. 11, it is possible to further reduce the power consumption as compared to the structure shown in FIG. 10, because the supply of the clock signal is stopped with respect to the OAM cell processors other than the target OAM cell processor which is to process the input cell.

Figure 12:
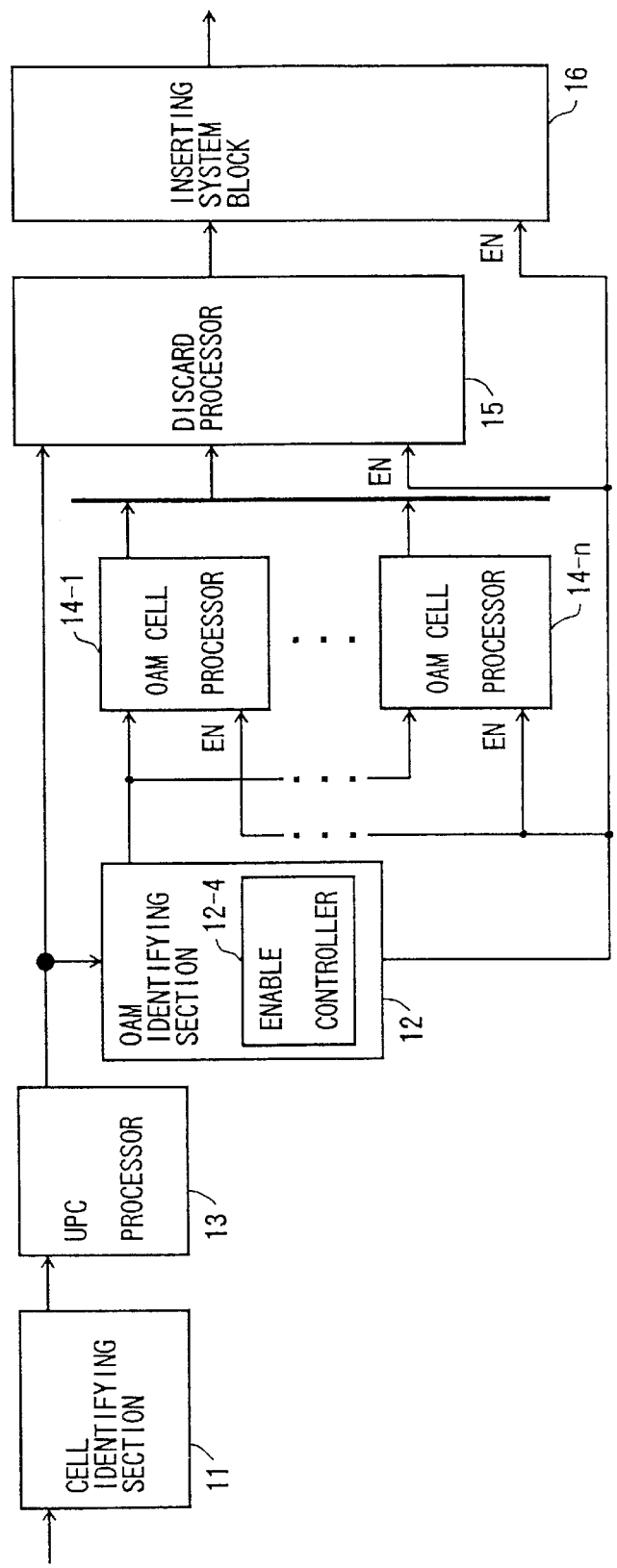
FIG. 12 is a diagram for explaining a cell processing schedule of OAM cell processors.
Figure 13:
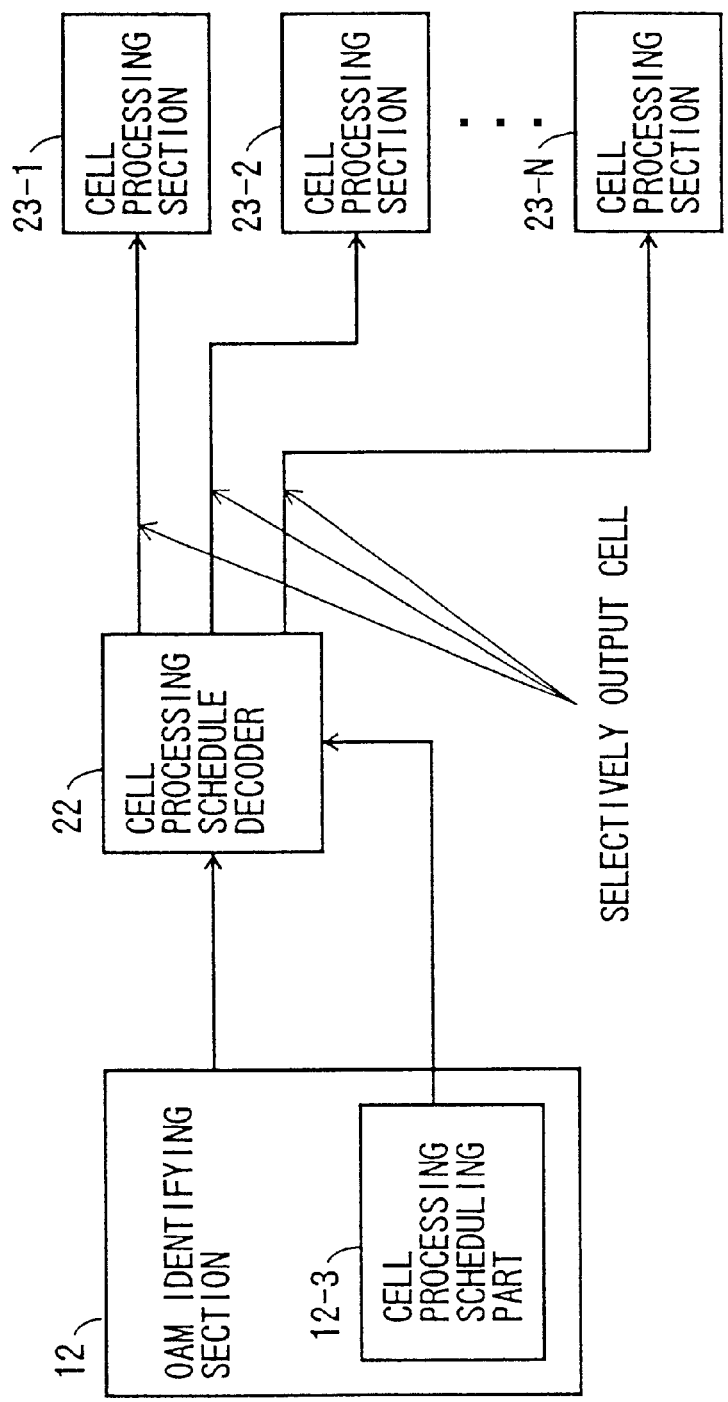
FIG. 13 is a diagram for explaining a cell processing schedule of OAM cell processors.

FIGS. 12 and 13 are diagrams for explaining a structure in which the cell processing sections provided in the stage subsequent to the OAM identifying section 12 are arranged in parallel.

In FIG. 12, the OAM cell processors 14-1 through 14-n which are provided in parallel, the discard processor 15 and the inserting system block 16 respectively have an operation enable (EN) setting part which is set by the enable controller 12-4 of the OAM identifying section 12, and each cell processing section stops the operation thereof when the operation enable (EN) is turned OFF, so as to block the input cell.

On the other hand, a cell processing schedule decoder 22 may be provided as shown in FIG. 13. This cell processing schedule decoder 22 decodes specifying information of each of cell processing sections 23-1 through 23-N which is to process the input cell and is determined by the cell processing scheduling part 12-3 of the OAM identifying section 12. The cell processing sections 23-1 through 23-N include the OAM cell processors 14-1 through 14-n, the discard processor 15 and the inserting system block 16, that is, cell processing sections provided in a stage subsequent to the OAM identifying section 12. Based on the decoded specifying information, the cell processing schedule decoder 22 selects a transfer path to a target cell processing section which is to process the input cell. Hence, the OAM identification information and the cell data thereof can be selectively transferred to the target cell processing section.

According to the structure shown in FIG. 13, it is unnecessary to provide a signal path for the operation enable (EN) signal 19.

By arranging the cell processing sections which are provided in a stage subsequent to the OAM identifying section 12 in parallel, it is possible to improve the processing throughput compared to a case where the cell processing sections are arranged in series. In addition, by employing the structure in which the cell processing sections other than the target cell processing section which is to process the input cell do not accept the input cell, it is possible to reduce the power consumption.

Furthermore, in the structure in which the cell processing sections are arranged in parallel, it is also possible for each cell processing section to make a reference to the operation enable (EN) signal and to reduce the power consumption by blocking the supply of the clock signal when the operation enable signal is turned OFF.

In the case where the cell processing sections are arranged in parallel, it becomes unnecessary to provide the structure for bypassing the cell through a bypass route as in the case of the structures shown in FIGS. 10 and 11 in which the cell processing sections are arranged in series.

Next, a description will be given of the functions of each cell processing section of the ATM layer cell processing apparatus according to the present invention realized by means of a program processing carried out by a processor.

Figure 14:
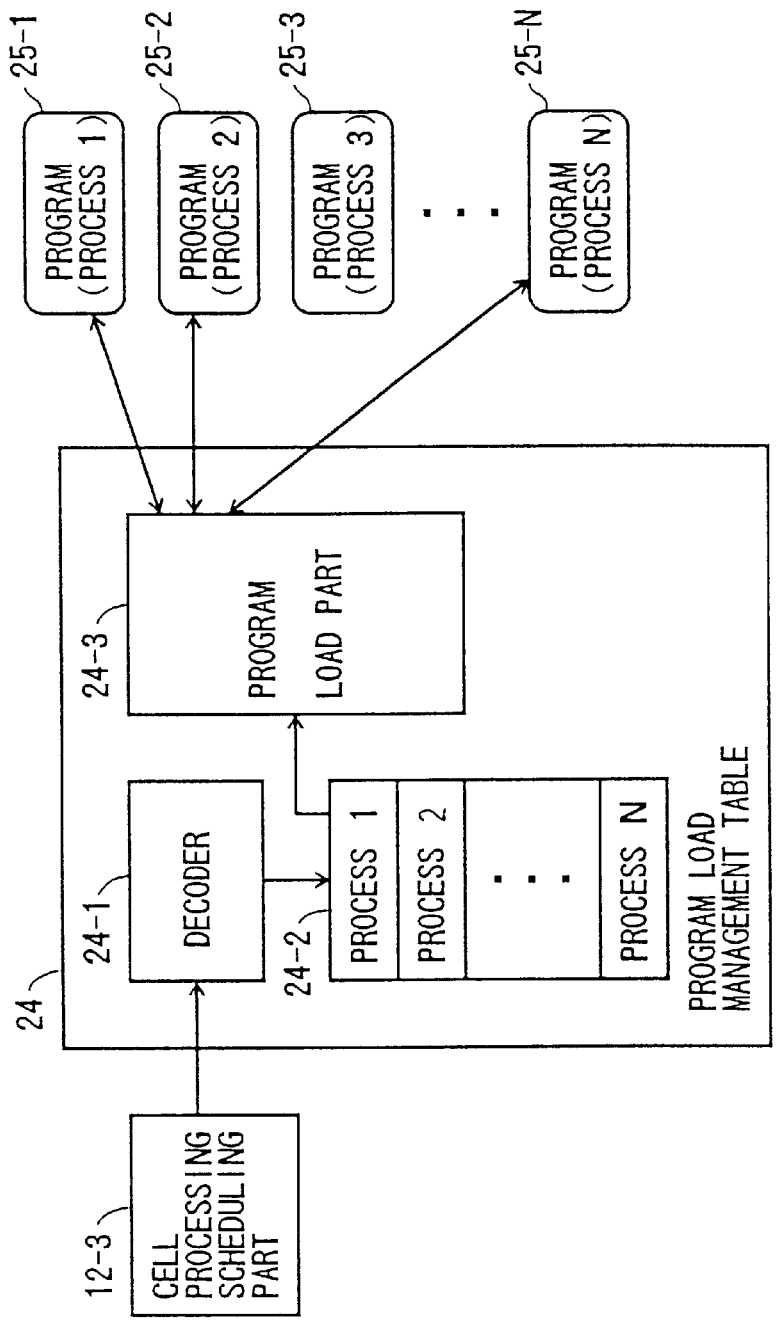
FIG. 14 is a diagram for explaining a program processing by a program load control.

FIG. 14 is a diagram for explaining a program processing by a program load control. As shown in FIG. 14, a program load controller 24 is additionally provided. This program load controller 24 controls the loading of the programs by decoding the scheduling information output from the cell processing scheduling part 12-3 of the OAM identifying section 12. In FIG. 14, those parts which are the same as those corresponding parts in FIGS. 5, 6 and 9 are designated by the same reference numerals, and a description thereof will be omitted.

In the program load controller 24, a decoder 24-1 decodes the scheduling information and writes each of processes 1 through N to be carried out in a program load management table 24-2. The program load management table 24-2 loads into a program load part 24-3 programs 25-1 through 25-N which are formed as modules for each of the processes 1 through N to be carried out.

Based on a process flow of the loaded program, the programs are successively written into a storage element such as a RAM, and the cell processing is started at a time when the writing of all of the processing program ends. Hence, the cell processing is carried out by generating the processing program necessary for the cell processing every time the cell arrives.

The modules of the programs may be formed in units of each function of each cell processing section, such as the OAM cell processors 14-1 through 14-n, the inserting cell assembling section 17 and the discard processor 15.

The arrived cell is subjected to processes such as the cell identification process, the UPC process and the OAM identification, and the cell processing scheduling part 12-3 of the OAM identifying section 12 determines the cell processing schedule subsequent to the OAM identification based on results of such processes. The cell processing is carried out by loading only the program related to the process which is to be carried out, based on the cell processing schedule determined by the cell processing scheduling part 12-3.

Alternatively, the modules of the programs may be formed in units of the cell processing schedules, instead of in units of each function of each cell processing section.

By creating programs of all anticipated cell processing schedules and loading the program corresponding to the cell processing scheduling information, it becomes unnecessary to load a plurality of programs as is required in the case described above where the program is created for each cell processing section. As a result, it is possible to load all of the program which is necessary to carry out the cell processing in response to one load instruction.

Therefore, by realizing the cell processing section by the program and carry out the cell processing by loading the program every time the cell arrives, it becomes easy to modify the specifications or expand the functions, thereby making it possible to carry out a flexible cell processing.

Figure 15:
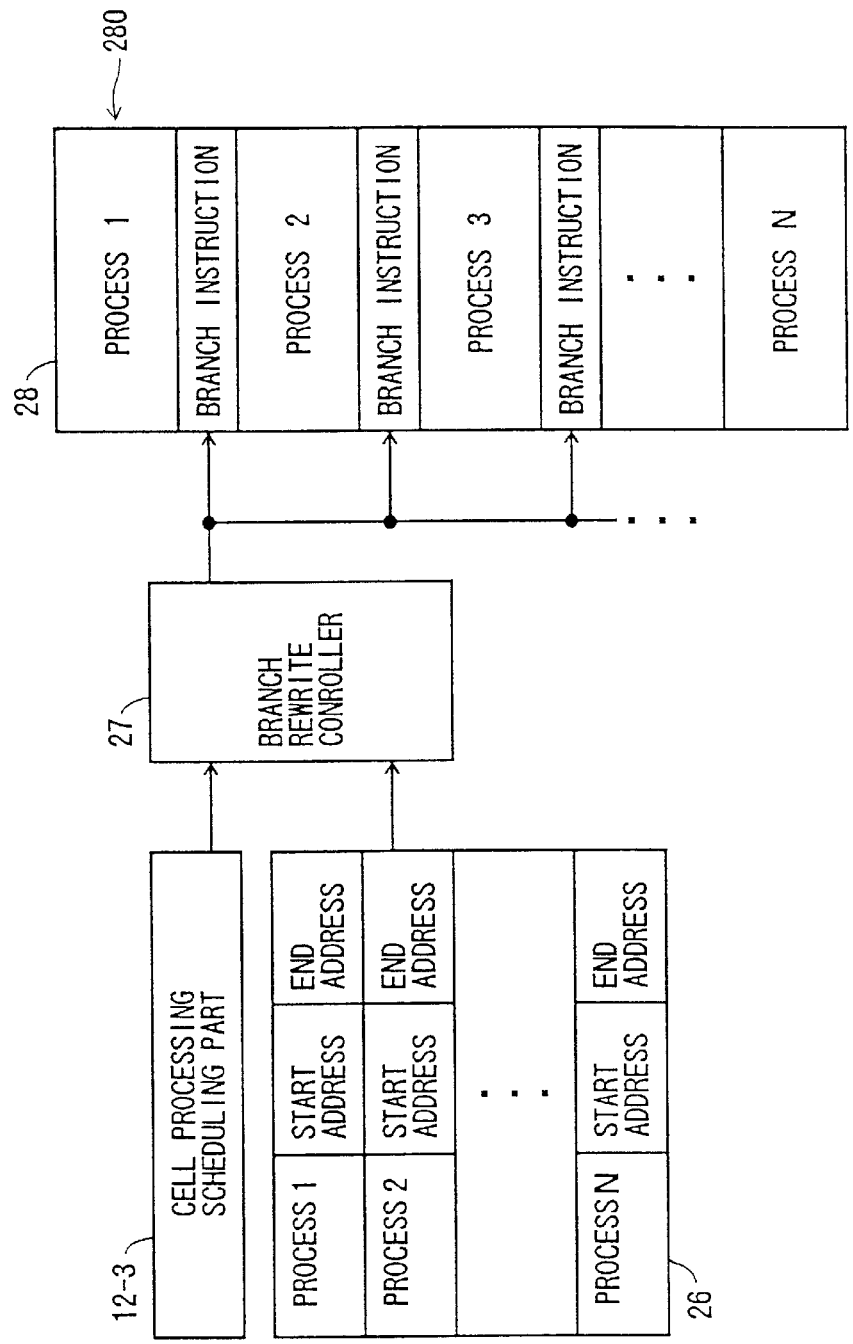
FIG. 15 is a diagram for explaining a program processing by a branch rewrite control.

FIG. 15 is a diagram for explaining a program processing by a branch rewrite control. In FIG. 15, those parts which are the same as those corresponding parts in FIGS. 5, 6 and 9 are designated by the same reference numerals, and a description thereof will be omitted.

As shown in FIG. 15, all cell processing programs 28 required for the cell processing are stored in a storage element 280 such as a RAM. A branch destination after the program of each cell processing ends is rewritten based on the cell processing scheduling information, so that the required cell processing can be carried out.

In this case, a branching rewrite controller 27 makes a reference to an address reference table 26 which stores information including a start address and an end address of the program corresponding to each cell processing, in addition to making a reference to the scheduling information received from the cell processing scheduling part 12-3. The branch rewrite controller 27 determines the program of the process which is to be carried out and the order of the processes, based on the scheduling information. In addition, the branch rewrite controller 27 successively writes, as the branch destination, the start address of a program of a process which is to be carried out next, into the end address of the program of the process which is to be carried out.

By rewriting the branch destination every time the cell arrives, it is possible to carry out a cell processing by only the target cell processing section which is to carry out the process while immediately jumping between programs after the processing schedule is determined.

When carrying out the cell processing by the program, it is possible to input to the program load controller 24 or the branch rewrite controller 27 the code which indicates "no process" and is output from the OAM identifying section 12 with respect to the programs other than the program of the target process which is to be carried out. In this case, the program load controller 24 or the branch rewrite controller 27 can skip a program which is unnecessary for the cell processing which is to be carried out.

Therefore, according to the present invention, the cell identifying section and the OAM identifying section are constructed as a single and a common functional block with respect to each of the OAM cell processing sections or OAM cell processors. For this reason, it is possible to reduce the scale of the ATM layer cell processing apparatus, particularly the part associated with the OAM cell processing section or OAM cell processors. In addition, by adding a schedule management function of the cell process subsequent to the OAM identifying section, it becomes possible to carry out a parallel processing with respect to the cell processing, and to improve the cell processing efficiency. Moreover, by arranging the OAM identifying section and the UPC processor at a stage subsequent to the cell identifying section, it becomes possible to further improve the cell processing efficiency.

Further, the present invention is not limited to these embodiments, but various variations and modifications may be made without departing from the scope of the present invention.

What is claimed is:

1. An ATM layer cell processing apparatus comprising:
   a plurality of cell processing sections, including a plurality of OAM cell processors provided with respect to each of OAM cell types;
   a cell identifying section outputting cell type information by decoding header information of an arrived cell;
   an OAM identifying section outputting OAM identification information including OAM type information identified based on OAM cell information of a payload and the cell type information, said cell identifying section and said OAM identifying section being provided in common with respect to said plurality of cell processing sections including said plurality of OAM cell processors; and
   a mechanism sending the OAM cell type information and cell data of the arrived cell to a cell processing section which is to process the arrived cell at a subsequent stage, based on the OAM identification information output from said OAM identification section.

2. The ATM layer cell processing apparatus as claimed in claim 1, which further comprises:
   a usage parameter control processor arranged at a stage preceding said OAM identifying section and outputting judgement information indicating conformity or non-conformity of usage parameter control,
   said OAM identifying section outputting the OAM identification information by decoding the judgement information together with the header information.

3. The ATM layer cell processing apparatus as claimed in claim 2, wherein said OAM identifying section identifies that said OAM identifying section is arranged at a stage subsequent to said usage parameter control processor based on monitoring point information of said usage parameter control processor.

4. The ATM layer cell processing apparatus as claimed in claim 1, wherein said OAM identifying section obtains judgement information by judging whether or not the ATM layer cell processing apparatus itself is located at an end point of connecting points in a network based on the cell type information output from said cell identifying section, with respect to an arrived OAM cell, and sends the judgement information to a cell processing section at a subsequent stage.

5. The ATM layer cell processing apparatus as claimed in claim 2, which further comprises:
   inserting cell assembling section assembling an OAM inserting cell,
   wherein said OAM identifying section comprises:
      means for specifying an OAM inserting cell output from an OAM cell processor at a subsequent stage, based on the cell type information, the judgement information from said usage parameter control processor, and the OAM cell information of the payload, and for sending information necessary for assembling the OAM inserting cell to said inserting cell assembling section,
   said inserting cell assembling section assembling the OAM inserting cell based on the information received from said OAM identifying section in parallel with an OAM cell processing of said OAM cell processor.

6. The ATM layer cell processing apparatus as claimed in claim 2, wherein said OAM identifying section comprises:
   a cell processing scheduling part managing a cell processing subsequent to an OAM identification,
   said cell processing scheduling part determining a target cell processing section which is to process the cell based on the cell type code, the judgement information from said usage parameter control processor and the OAM cell information of the payload, and controlling only the target cell processing section in an operating state of said plurality of cell processing sections.

7. The ATM layer cell processing apparatus as claimed in claim 6, wherein:

said plurality of cell processing sections include a plurality of arbitrary cell processing sections which carry out processes sequentially subsequent to an OAM identification, each of said arbitrary cell processing sections comprises an operation enable setting part, said cell processing scheduling part controls to an ON state the operation enable setting part of only a target cell processing section which is to process the cell of the arbitrary cell processing sections, and each of said arbitrary cell processing sections passing through the cell to a cell processing section at a next stage when the operation enable setting part thereof is controlled to an OFF state, and carries out a cell processing with respect to the cell when the operation enable setting part thereof is controlled to the ON state.

8. The ATM layer cell processing apparatus as claimed in claim 7, wherein said operation enable setting part stops a supply of a clock signal to the cell processing section to which said operation enable setting part belongs when controlled to the OFF state, so that the cell is bypassed through the cell processing sections other than the target cell processing section and is sent to the cell processing section at the next stage.

9. The ATM layer cell processing apparatus as claimed in claim 6, wherein:

said plurality of cell processing sections include a plurality of arbitrary cell processing sections which carry out processes in parallel subsequent to an OAM identification, each of said arbitrary cell processing sections comprises an operation enable setting part, said cell processing scheduling part controls to an ON state the operation enable setting part of only a target cell processing section which is to process the cell of the arbitrary cell processing sections, and each of said arbitrary cell processing sections blocking the cell when the operation enable setting part thereof is controlled to an OFF state.

10. The ATM layer cell processing apparatus as claimed in claim 6, wherein said plurality of cell processing sections include a plurality of arbitrary cell processing sections which carry out processes in parallel subsequent to an OAM identification, and said ATM layer cell processing apparatus further comprises:

a cell processing scheduling decoder decoding a cell processing section specifying information from said cell processing scheduling part and transferring the cell to a cell processing section indicated by the cell processing section specifying information, so that the cell is transferred to only said target cell processing section.

11. The ATM layer cell processing apparatus as claimed in claim 10, which further comprises:

means for supplying a clock signal to only said target cell processing section, based on the cell processing section specifying information from said cell processing scheduling part.

12. The ATM layer cell processing apparatus as claimed in claim 6, wherein each process subsequent to an OAM identification is carried out by a processing program which is formed as a module, and each processing program formed as the module is loaded based on information related to a target cell processing which is to be carried out and is determined by said cell processing scheduling part every time a cell arrives, so that each process subsequent to the OAM identification is carried out by executing the loaded processing program.

13. The ATM layer cell processing apparatus as claimed in claim 12, wherein said cell processing scheduling part outputs a code indicating "no process" with respect to an arbitrary cell processing which is other than the target cell processing, and stops the arbitrary cell processing in response to said code indicating "no process".

14. The ATM layer cell processing apparatus as claimed in claim 12, wherein the processing program is formed as the module in units of functions of each of said cell processing sections, and only the processing program of the target cell processing section is loaded based on the information determined by said cell processing scheduling part.

15. The ATM layer cell processing apparatus as claimed in claim 14, which further comprises:

a program load controller controlling loading of the processing program which is formed as the module, said program load controller rewriting the processing program every time a cell arrives, based on the information determined by said cell processing scheduling part.

16. The ATM layer cell processing apparatus as claimed in claim 15, wherein said program load controller loads all of processing programs necessary for the target cell processing according to an executing order, and writes the processing programs in a storage element.

17. The ATM layer cell processing apparatus as claimed in claim 12, wherein the processing program is formed as the module in units of cell processing schedules, and a cell processing is carried out by loading a processing program of a cell processing schedule based on the information determined by said cell processing scheduling part.

18. The ATM layer cell processing apparatus as claimed in claim 6, which further comprises:

a storage element storing all of processing programs of each of processes subsequent to the OAM identification; and a branch rewrite controller rewriting a storage position of a processing program which is executed first and a branch destination storage position after the processing program ends for each cell which arrives, based on the information determined by said cell processing scheduling part, so that each process is carried out by executing the processing program by successively jumping to only a processing program of a cell process which is to be carried out subsequent to the OAM identification.

* * * * *

UNITED STATES PATENT AND TRADEMARK OFFICE
CERTIFICATE OF CORRECTION

PATENT NO. : 6,850,520 B1
APPLICATION NO. : 09/409145
DATED : February 1, 2005
INVENTOR(S) : Shuji Takada and Yasuhiro Ooba It is certified that error appears in the above-identified patent and that said Letters Patent is hereby corrected as shown below:

On the title of the patent, item (*) stating that "This patent is subject to a terminal disclaimer." should be deleted.

Signed and Sealed this

Thirtieth Day of March, 2010

David J. Kappos
*Director of the United States Patent and Trademark Office*